Sept. 2, 1924.
C. DORNIER
1,506,817
BEARING PLANE FOR AIRCRAFT
Filed Dec. 23, 1921
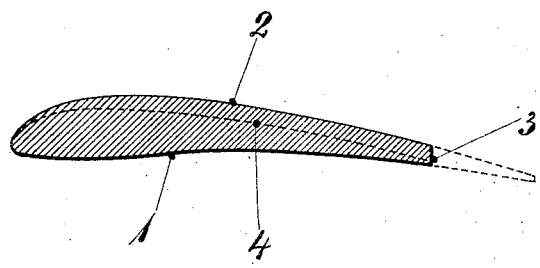
INVENTOR:
Claudius Dornier Patented Sept. 2, 1924.

1,506,817

UNITED STATES PATENT OFFICE.

CLAUDIUS DORNIER, OF FRIEDRICHSHAFEN, GERMANY, ASSIGNOR, BY MESNE ASSIGNMENTS, TO DORNIER-METALLBAUTEN GESELLSCHAFT MIT BESCHRANKTER HAFTUNG, AND SAID CLAUDIUS DORNIER, BOTH OF FRIEDRICHSHAFEN, GERMANY.

BEARING PLANE FOR AIRCRAFT.

Application filed December 23, 1921. Serial No. 524,477.

*To all whom it may concern:*

Be it known that I, CLAUDIUS DORNIER, a German citizen, residing at Friedrichshafen a/B., Germany, have invented certain new and useful Improvements in Bearing Planes for Aircraft, of which the following is a specification.

My invention relates to bearing planes for aircraft and its particular object is to increase the height of the plane at the rear without any substantial deterioration of aerodynamic efficiency.

It was held up till now that in a bearing plane the shape and configuration of the rear edge plays an important rôle with regard to the air resistance. I have now ascertained that the experiences made with bodies offering a minimum of air resistance cannot be directly applied to bearing planes or other surfaces having considerable depth as compared with their frontal height. More particularly the air resistance is not increased materially if the rear edge of the bearing plane instead of being made thin, as is the general practice now, forms a surface extending at an angle to the bearing plane.

The greater height of section of the rear portion of the bearing plane, as compared with a plane of equal width but with the usual thin rear edge, results in a more favorable design of the rear spar which is subjected to a particularly heavy stress and which can now be made larger in section.

In the drawings affixed to this specification and forming part thereof, a bearing surface embodying my invention is illustrated in diagrammatic section by way of example.

Referring to the drawings, 1 is the lower and 2 is the upper surface of a streamlined bearing plane. 3 is a surface of substantial height extending substantially at right angles to 1 and 2 and forming the rear face of the plane. As the drawing shows this bearing plane has the cross section of a streamlined body with about one fifth of its length cut away at its rear end. Obviously a far stronger spar can be accommodated in the rear portion of this plane than in a plane of usual configuration such as indicated by the dotted line 4.

I wish it to be understood that I do not desire to be limited to the exact details of construction shown and described, for obvious modifications will occur to a person skilled in the art.

I claim:

A bearing plane for aircraft having the cross section of a streamlined body with about one fifth of its length cut away at its rear end.

In testimony whereof I affix my signature.

CLAUDIUS DORNIER.